United States Patent
Yamaguchi et al.

(10) Patent No.: US 8,294,869 B2
(45) Date of Patent: Oct. 23, 2012

(54) IMAGE DISPLAY (75) Inventors: Shinya Yamaguchi, Mitaka (JP); Mutsuko Hatano, Kokubunji (JP); Takashi Hattori, Musashimurayama (JP); Naoya Okada, Kokubunji (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 580 days.

(21) Appl. No.: 12/509,673

(22) Filed: Jul. 27, 2009

(65) Prior Publication Data

US 2010/0073620 A1     Mar. 25, 2010

(30) Foreign Application Priority Data

Sep. 19, 2008   (JP) ................................ 2008-240272

(51) Int. Cl.
*G02F 1/1333* (2006.01)
(52) U.S. Cl. ....................... 349/160; 349/158
(58) Field of Classification Search .......... 349/158–160
See application file for complete search history.

(56) References Cited

U.S. PATENT DOCUMENTS

| | | | |
|---|---|---|---|
| 6,771,332 B2 | 8/2004 | Yamada | |
| 6,989,874 B2* | 1/2006 | Chae | 349/158 |
| 7,505,107 B2 | 3/2009 | Takaishi | |
| 7,787,097 B2* | 8/2010 | Satoh | 349/158 |
| 2003/0213956 A1* | 11/2003 | Hioki et al. | 257/59 |
| 2004/0066484 A1* | 4/2004 | Tokailin et al. | 349/158 |

FOREIGN PATENT DOCUMENTS

| | | |
|---|---|---|
| JP | 60-243632 | 12/1985 |
| JP | 10-82993 | 3/1998 |
| JP | 2002-328354 | 11/2002 |
| JP | 2003-114433 | 4/2003 |
| JP | 2005-331914 | 12/2005 |
| WO | WO 2006/090434 | 8/2006 |

* cited by examiner

*Primary Examiner* — Dung T. Nguyen
(74) *Attorney, Agent, or Firm* — Antonelli, Terry, Stout & Kraus, LLP.

(57) ABSTRACT

To provide an image display which is capable of preventing fracturing of a substrate which is attributable to a substrate expansion arising from heating or humidification during a manufacture process, impact in use, or distortion when curved display is conducted, a connection failure between a semiconductor chip and a wiring terminal which are mounted on the substrate, and crack occurring in the substrate in the vicinity of an area where the semiconductor chip is mounted, with no need to add members and with no limit of pulling the wiring around. An image display part is formed on one surface of a flexible substrate, and a groove with a depth not reaching a thickness of the substrate is continuously or intermittently defined in another surface of the substrate.

4 Claims, 9 Drawing Sheets

IMAGE DISPLAY

CLAIM OF PRIORITY

The present application claims priority from Japanese patent application JP 2008-240272 filed on Sep. 19, 2008, the content of which is hereby incorporated by reference into this application.

BACKGROUND OF THE INVENTION

1. Field of the Invention

The present invention relates to an image display, and more particularly to an image display having a flexible substrate made of, for example, a resin material.

2. Description of the Related Art

In recent years, there has been known a flexible display using a flexible substrate made of, for example, a resin material instead of a conventional glass substrate. This is because the use of the flexible substrate improves thinning, weight saving, impact resistance, and curved display property of the image display.

However, a display panel using the flexible substrate is subjected to a stress attributed to various factors such as substrate expansion arising from heating or humidification during a manufacture process, impact in use, and distortion when curved display is conducted. Because the stress leads to such a problem that the flexible substrate is fractured, the stress becomes a major issue for practical application. In addition to fracturing of the substrate, it is confirmed that there occurs a connection failure between a semiconductor chip and a wiring terminal which are mounted on the substrate, and the substrate cracks in the vicinity of an area where a semiconductor chip is mounted.

The former problem with the substrate fracturing is recently revealed, but the latter problem with the connection failure of the semiconductor chip and crack of the peripheral substrate has been known in the pasts. For that reason, a device is made so that the stress occurring in the flexible display is not transmitted to the area where the semiconductor chip is mounted.

There is a technique that has already been put in practical use in which the semiconductor chip is mounted on the flexible substrate formed individually from the display panel, a terminal part of the flexible substrate is connected to the display panel by crimping, and a part of the flexible substrate on which the semiconductor chip is mounted is bent and stuck onto a rear surface of the substrate of the liquid crystal display panel with an adhesive tape.

Also, for example, JP-A-2003-114433, and JP-A-2005-331914 disclose other devices.

JP-A-2003-114433 discloses a technique by which in a liquid crystal image display having an auxiliary light source device, a slender cut is made in the flexible substrate to form a strip part, and a group of semiconductor chip elements related to the light source is mounted on the strip part.

JP-A-2005-331914 discloses a configuration where in a part of the flexible substrate on which the semiconductor chip is mounted, a notch is made in the substrate so as to surround a part of the semiconductor chip, and the notch allows a width of the substrate extending from an image display region to the semiconductor chip to be reduced.

However, the provision of the flexible substrate independently from the display panel as in the related art increases the member costs as much, and also requires the process costs for the cramping process.

Also, the liquid crystal image display disclosed in JP-A-2003-114433 is complicated in a cutting process, and further the formed strip part is slender. This leads to such a problem that the treatment is difficult.

Also, the flexible display disclosed in JP-A-2005-331914 is complicated in a notching process as in JP-A-2003-114433, and also requires that a wiring between the image display region and the semiconductor chip is pulled around so as to avoid the part where the notch is formed.

SUMMARY OF THE INVENTION

An object of the present invention is to provide an image display which is capable of preventing fracturing of the substrate which is attributable to a substrate expansion arising from heating or humidification during a manufacture process, impact in use, or distortion when curved display is conducted, a connection failure between a semiconductor chip and a wiring terminal which are mounted on the substrate, and the crack occurring in the substrate in the vicinity of an area where a semiconductor chip is mounted, with no need to add the members and with no limit of pulling the wiring around.

The image display according to the present invention is configured to absorb a stress exerted on the substrate by a groove defined in the substrate (a recess having a depth not reaching a thickness of the substrate) so as to prevent the stress from being transmitted to an area other than the groove.

The configuration of the present invention can be made, for example, as follows.

(1) An image display according to the present invention includes: an image display part; and a flexible substrate having one surface on which the image display part is formed, and another surface in which a groove having a depth not reaching a thickness of the substrate is continuously or intermittently formed.

(2) The image display according to the present invention is that in the configuration (1), the groove is formed of plural continuous or intermittent parallel lines which are parallel to or perpendicular to a curved direction of the image display.

(3) The image display according to the present invention is that in the configuration (1), the groove is formed of plural continuous or intermittent parallel lines which are parallel to or perpendicular to one side of the substrate.

(4) The image display according to the present invention is that in the configuration (1), the groove is formed of plural continuous or intermittent radial lines which are directed from a center of the substrate toward the outside parallel to or perpendicular to one side of the substrate.

(5) The image display according to the present invention is that in the configuration (1), the groove is formed of plural continuous or intermittent lines which are substantially concentric about a center of the substrate.

(6) The image display according to the present invention is that in the configuration (1), a semiconductor chip is mounted on one surface of the substrate together with the image display part so as to be adjacent to the image display part, and the groove is continuously or intermittently formed so as to draw an area in which the image display part is formed, and an area in which the semiconductor chip is mounted.

(7) The image display according to the present invention is that in the configuration (1), the continuous or intermittent groove is formed as a pattern which surrounds the area in which the semiconductor chip is mounted, and both ends of which reach the periphery of the substrate.

(8) The image display according to the present invention is that in the configuration (1), plural the semiconductor chips are mounted, and the continuous or intermittent groove is formed in another surface of the substrate to draw an area in which one or the plural semiconductor chips are mounted.

(9) The image display according to the present invention is that the groove according to the configurations (1) to (5), and the groove according to the configurations (6) to (8) are formed in the same substrate in combination.

(10) The image display according to the present invention is that in any one of the configurations (1) to (8), the groove is formed by irradiation of a laser beam.

(11) The image display according to the present invention is that in the configuration (1), the image display is a liquid crystal image display, and the image display part faces another flexible substrate with the substrate and liquid crystal held therebetween.

(12) The image display according to the present invention is that in the configuration (1), the image display is an organic EL display, and the image display part is formed by deposition of an organic film emitting a light, and a flexible opposite substrate also serving as an electrode is disposed on a surface of the organic film.

(13) An image display according to the present invention includes at least a display panel, a first frame disposed on one surface of the display panel, and a second frame disposed on another surface of the display panel, which are modularized; the display panel has a flexible substrate on one surface of which is formed an image display part, and in another surface of which is continuously or intermittently formed a groove having a depth not reaching a thickness of the substrate; and a projection is formed on each surface of the first frame and the second frame at the display panel side so as to face an area of the substrate in which no groove is formed, and hold the substrate.

(14) The image display according to the present invention is that in the configuration of (12), the first frame and the second frame are so curved as to project in the same direction.

(15) The image display according to the present invention is that in the configuration of (12), the display panel is a liquid crystal display panel, and a backlight is disposed between the display panel and the second frame.

(16) The image display according to the present invention is that in the configuration of (12), the display panel is an organic EL panel, and a reflector plate is disposed between the display panel and the second frame.

The above configurations are mere examples, and the present invention can be appropriately modified without departing from a technical concept of the invention. Also, examples of the configurations of the present invention other than the above configurations become apparent from the entire description or drawings of the present specification.

The image display configured as described above is capable of preventing fracturing of the substrate which is attributable to a substrate expansion arising from heating or humidification during a manufacture process, impact in use, or distortion when curved display is conducted, a connection failure between a semiconductor chip and a wiring terminal which are mounted on the substrate, and the crack occurring in the substrate in the vicinity of an area where a semiconductor chip is mounted, with no need to add the members and with no limit of pulling the wiring around.

Other advantages of the present invention will become apparent from the entire description of the present specification.

DETAILED DESCRIPTION OF THE INVENTION

Embodiments of the present invention will be described with reference to the accompanying drawings. In the respective drawings and the respective embodiments, identical or similar components are denoted by like references, and their description will be omitted.

[First Embodiment]

Figures 1A, 1B:
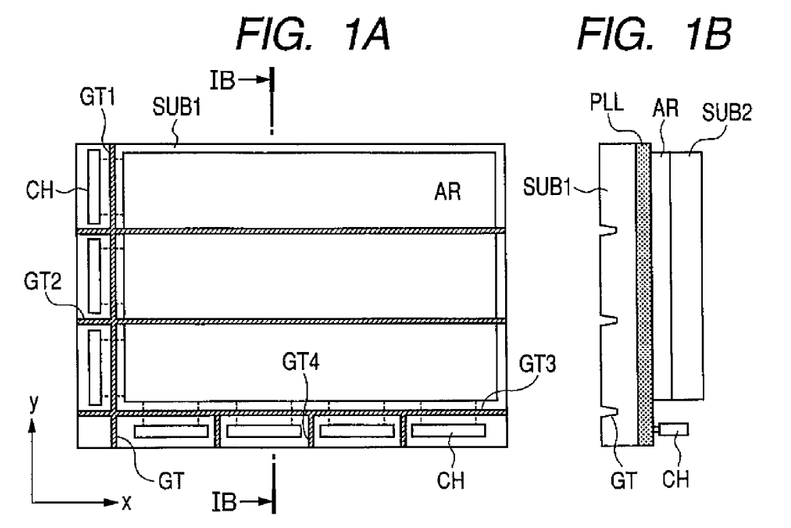
FIGS. 1A and 1B are configuration diagrams showing an image display according to a first embodiment of the present invention, respectively.

FIGS. 1A and 1B are configuration diagrams showing an image display according to a first embodiment of the present invention, respectively. FIG. 1A is a plan view, and FIG. 1B is a cross-sectional view taken along a line IB-IB of FIG. 1A.

First, a flexible substrate SUB1 is made of, for example, a resin material, and a so-called TFT layer PLL is formed on a surface of the substrate SUB1 at an image display part AR side. The TFT layer PLL is formed of a laminated body in which an insulating film, a semiconductor layer, and a metal film are laminated on one another in a given order in a given pattern to configure an electronic circuit necessary for image display. Although not shown, the TFT layer PLL is, for example, deposited on a surface of the substrate SUB1 via an adhesive layer. This is because there is employed a technique by which after the TFT layer PLL has been formed on a provisional substrate made of glass having heat resistance and rigidity, the TFT layer PLL is transferred onto the substrate SUB1.

On a surface of the TFT layer PLL is formed an image display part AR, and a flexible substrate SUB2, for example, made of a resin material is disposed to face a surface of the image display part AR. When the image display part AR is, for example, of a liquid crystal system, liquid crystal is held between the image display part AR and the substrate SUB2. When the image display part AR is, for example, of an organic EL system, a light emitting organic film is deposited on the image display part AR through a method such as vapor deposition. The SUB2 may serve as an electrode. The substrate SUB2 is slightly smaller in area than the substrate SUB1. For example, the substrate SUB2 is disposed on the substrate SUB1 in such a manner that a front surface of the substrate SUB1 is exposed to the left and lower sides of the figure in a planar view. A semiconductor chip CH which will be described later may be mounted on an area of the substrate SUB1 which is exposed from the substrate SUB2.

On the TFT layer PLL in the image display part AR, respective pixels having thin film transistors together with signal lines are arranged in a matrix. The TFT layer PLL extends to the area of the substrate SUB1 which is exposed from the substrate SUB2, and the signal lines within the image display part AR are drawn out to a peripheral part by the aid of the TFT layer PLL.

Plural (three in the figure) semiconductor chips CH are mounted in the area of the substrate SUB1 which is exposed from the substrate SUB2 at the left side of the figure in parallel along a direction y in the figure. Those semiconductor chips CH are, for example, formed of scanning signal driver circuits, which are connected with gate signal lines (not shown) extending in an x-direction of the figure, and disposed in parallel in a y-direction in the image display part AR. Also, plural (four in the figure) semiconductor chips CH are mounted in parallel in the x-direction of the figure, in the area of the substrate SUB1 which is exposed from the substrate SUB2 at the lower side of the figure. Those semiconductor chips CH are, for example, formed of video signal driver circuits, which are connected with drain signal lines (not shown) extending in the y-direction of the figure and disposed in parallel in the x-direction in the image display part AR. In the image display part AR, each pixel is configured in an area surrounded by a pair of adjacent gate signal lines and a pair of adjacent drain signal lines.

Grooves (recesses each having a depth not reaching a thickness of the substrate) GT are defined in a rear surface of the substrate SUB1 on which the above respective semiconductor chips CH are mounted. The grooves GT are defined as follows when viewed from the image display part AR side of the substrate SUB1.

First, as shown in FIG. 1A, a groove (indicated by symbol GT1) extending from one side of the substrate SUB1 to an opposite side thereof in the y-direction of the figure is defined between the area in which the semiconductor chips CH constituting the scanning signal driver circuit are mounted and the liquid crystal image display area AR so as to draw those respective areas. Grooves (indicated by symbol GT2 in the figure) crossing from a left side of the panel to a right side thereof in the x-direction of the figure are defined in the area where the semiconductor chips CH are mounted, so as to draw respective areas in which one semiconductor chip CH and another semiconductor chip CH adjacent to that chip are mounted, respectively.

Also, a groove (indicated by symbol GT3) extending from one side of the substrate SUB1 to an opposite side thereof in the x-direction of the figure is defined between the area in which the semiconductor chips CH constituting the video signal driver circuit are mounted and the liquid crystal image display area AR so as to draw those respective areas. Grooves (indicated by symbol GT4 in the figure) extending from a portion of the groove GT3 to a lower side of the figure in the y-direction of the figure are defined in the area where the semiconductor chips CH are mounted, so as to draw respective areas in which one semiconductor chip CH and another semiconductor chip CH adjacent to that chip are mounted, respectively.

The grooves GT thus defined are configured by a combination of a larger pattern that divide the entire panel into substantially equal three parts in the y-direction, and a pattern which surrounds the regions in which the semiconductor chips CH are mounted, and both ends of which reach the periphery of the substrate SUB1. With the above patterns, the entire panel is divided into plural larger areas, and also the area in which the respective semiconductor chips CH are mounted are drawn by the respective grooves GT as the image display part AR and the areas in which other semiconductor chips CH are mounted.

Figure 2:
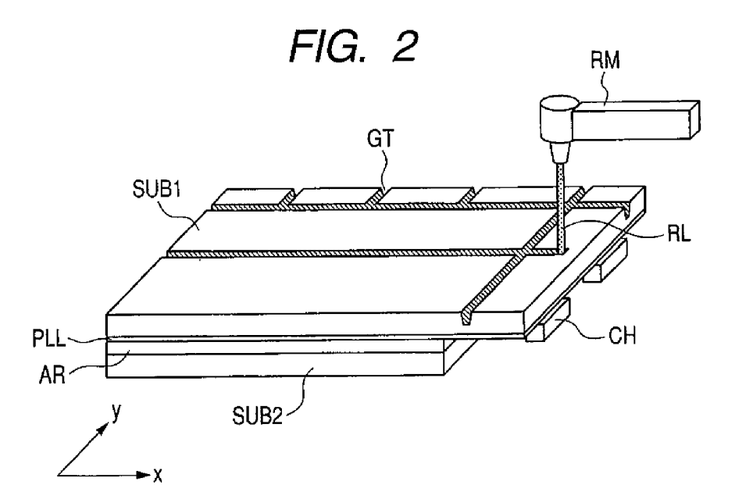
FIG. 2 is a perspective view showing an example of a method of defining the grooves in a rear surface of a substrate of the image display according to the present invention.

FIG. 2 is a perspective view showing an example of a method for forming the grooves GT in the substrate SUB1 in the above-described image display. The image display shown in FIG. 2 is arranged in such a manner that a rear surface (a surface opposite to the image display part AR) of the substrate SUB1 faces a laser beam machine RM.

The image display is configured, for example, such that the substrate SUB2 is arranged to face the substrate SUB1, and the semiconductor chips CH are mounted on the substrate SUB1. The image display is put on, for example, an X-Y stage (not shown) so as to travel in the x- and y-directions of the figure with respect to the laser beam machine RM. The grooves GT with the patterns shown in FIG. 1A can be defined in the rear surface of the substrate SUB1 by irradiation of a laser beam RL from the laser beam machine RM, and travel of the image display in the x- and y-directions.

The laser beam RL from the laser beam machine RM enters the substrate SUB1 up to a depth determined according to a wavelength of the laser beam RL and a light absorption coefficient of the substrate SUB1, and the grooves GT are formed by evaporation of a substrate material which is attributable to instantaneous heating. The intensity of the laser beam RL is appropriately adjusted according to the light absorption coefficient of the substrate SUB1, thereby enabling the depth of the grooves GT formed in the substrate SUB1 to be readily set with high precision.

In the image display thus configured, the entire panel is divided into plural larger areas, and also the area in which the respective semiconductor chips CH are mounted is drawn by the grooves GT as the image display part AR and the areas in which other semiconductor chips CH are mounted. In this case, for example, an impact applied to the panel and a stress generated by curvature of the panel are absorbed by the grooves GT to improve the impact resistance of the entire panel, and readily curve the panel in the y-direction. Also, because the impact and the stress can be prevented from being transmitted to the areas in which the respective semiconductor chips CT are mounted, it is possible to prevent a failure of connection between the semiconductor chips CT and wiring terminals formed on the substrate SUB1, and a crack occurring in the substrate SUB1 in the vicinity of the areas in which the semiconductor chips CT are mounted.

Figure 3A:
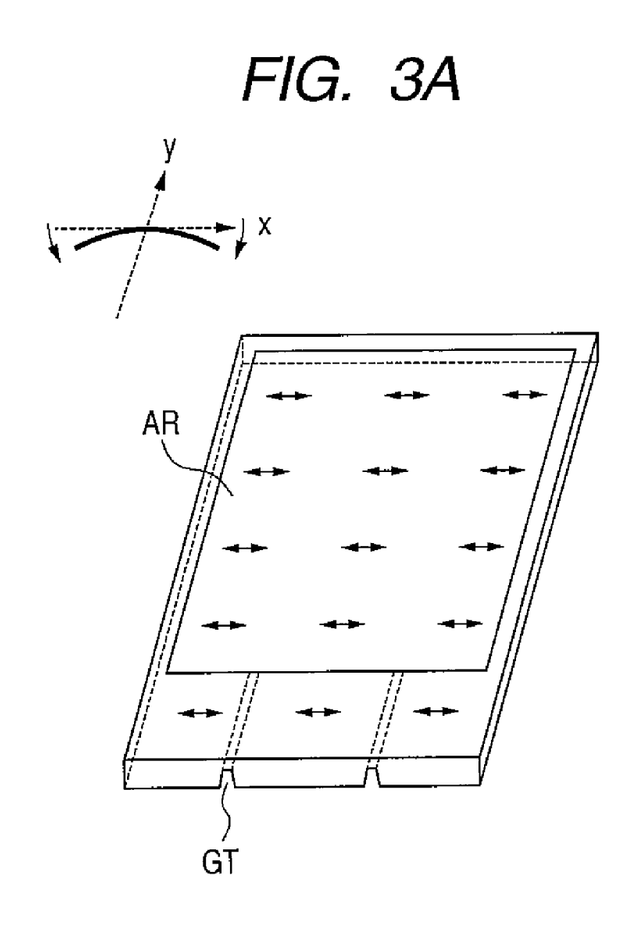
FIGS. 3A and 3B are explanatory diagrams showing the effects of the image display according to the present invention, respectively.
Figure 3B:
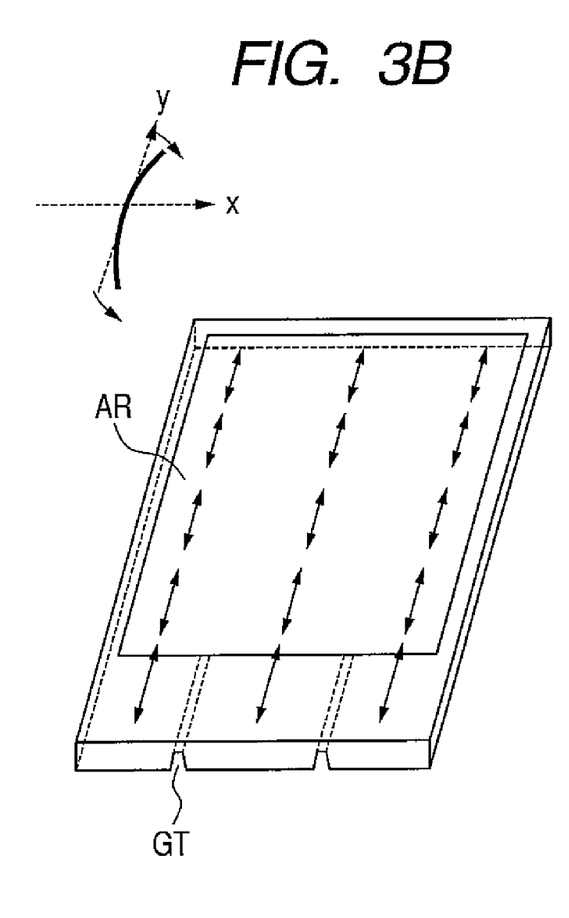

First, the advantages of the grooves GT that divide the entire panel into the plural larger areas will be described. FIGS. 3A and 3B are diagrams showing how the stress generated by the impact to the image display or curvature of the image display changes according to the grooves GT defined in the substrate SUB1 with a distribution of the stress. FIG. 3A shows a case of the impact or curvature along the x-direction of the image display, and FIG. 3B shows a case of the impact or curvature along the y-direction of the same image display. The image display shown in FIGS. 3A and 3B has a pattern in which two parallel grooves GT are defined in the y-direction for simplification of description.

As shown in FIG. 3A, when the impact or curvature along the x-direction is applied to the image display, distortion stresses (indicated by vectors in the figure) are generated in most of the area in parallel to the x-direction, but the stresses are absorbed by the grooves GT, and the distortion stresses do not cross the grooves GT in the area sandwiched between the grooves GT, and remain small values within the area. Accordingly, it is possible to prevent fracturing of the substrate, the connection failure between the semiconductor chips CH and the substrate SUB1, and occurrence of crack in the respective areas sandwiched between the grooves GT.

As shown in FIG. 3B, when the impact or curvature along the y-direction is applied to the image display, distortion stresses (indicated by vectors in the figure) are generated in most of the area in parallel to the y-direction. However, in this case, the grooves GT have no effect of absorbing the distortion stress. The magnitude of the distortion stress in the respective areas sandwiched between the grooves GT is equal to that when no groove GT is defined. In other words, the grooves GT adversely affect nothing. Accordingly, when a direction of the stress generated by the impact or curvature is known in advance, the grooves GT are formed in a given direction appropriate to the direction of stress, resulting in such an advantage that the stress of the entire panel can be reduced.

[Second Embodiment]

Figure 4A:
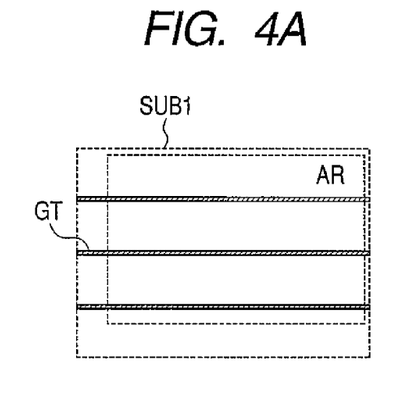
FIGS. 4A, 4B, 4C, and 4D are configuration diagrams showing second to fifth embodiments of the present invention, respectively.

FIG. 4A is a configuration diagram showing an image display according to a second embodiment of the present invention.

Referring to FIG. 4A, configurations different from that in the case of FIG. 1A reside in that the number of grooves GT is three, and the entire panel is divided into four smaller areas. When the number of grooves GT along a given direction is thus increased, there is advantageous in that the stress can be reduced when the curvature is smaller in the radius of curvature. The radius of curvature which can be dealt with is smaller as the number of grooves GT is larger. On the other hand, there is disadvantageous in that the strength of the entire panel is reduced, and the costs of a process for forming a larger number of grooves GT increase. For that reason, an appropriate number of grooves GT may be set according to the use condition. Accordingly, the number of grooves GT is not limited to three or four.

[Third Embodiment]

Figure 4B:
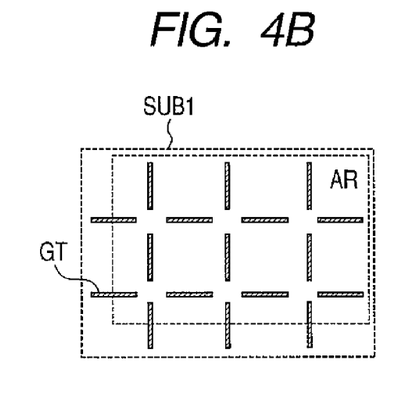

FIG. 4B is a configuration diagram showing an image display according to a third embodiment of the present invention.

Referring to FIG. 4B, configurations different from that in the case of FIG. 4A reside in that the grooves GT defined to divide and surround the respective areas are not continuous, but partially intermittent grooves are added together in the x-direction and the y-direction. In this case, even if the impact or curvature to be applied to the panel is in both of the x-direction and the y-direction, there is advantageous in that a part of the intermittent grooves GT can always absorb the stress. Therefore, the strength of the entire panel can be improved under an environment where a direction of the stress is not determined in advance. Further, because, in addition to the curvature in one direction, a curvature in a direction perpendicular to the one direction is enabled at some level, a display method in which curvature is made in both of the x-direction and the y-direction at the same time is also enabled. On the other hand, because the stress absorption effect per groove GT is smaller than that in FIG. 4A with respect to curvature in a specific direction, there is advantageous in that a larger number of grooves GT must be formed with an aim to deal with the same radius of curvature. It is needless to say that the formation pattern of the grooves GT in FIG. 4B is not limited to the above example, but pitches can be changed between the x-direction and the y-direction.

[Fourth Embodiment]

Figure 4C:
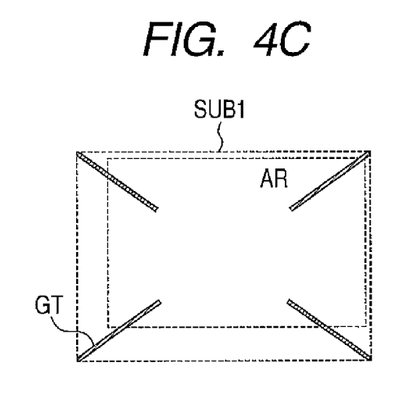

FIG. 4C is a configuration diagram showing an image display according to a fourth embodiment of the present invention.

Referring to FIG. 4C, the grooves GT are formed in an intermittent pattern along a direction of extending radially from the center of the substrate. Usually, it is general that the image display is rectangular. However, when the grooves GT are based on the above configuration, it is found through results of experiments or simulation that the distortion stress generated by expansion of the flexible substrate which arises from a heat stress or humidification during a manufacture process distributes concentrically from the center of the substrate, and is concentrated on four corners of the substrate. In this case, the four corners of the substrate become weakest, and the strength of the entire image display may be determined according to the substrate fracturing or crack in those areas. In the case of FIG. 4C, the grooves are defined toward the substrate corners, thereby enabling the distortion stress in those areas to be concentrated on the grooves GT. As a result, reliability of heat stress or humidification can be improved. In this embodiment, four grooves GT are arranged at the four corners of the substrate. Also, the grooves GT in the x-direction or the y-direction, extending radially from the center of the substrate, may be added. The number of grooves and the length of grooves can be selected according to the use environment, and are not limited to the pattern shown in FIG. 4C.

[Fifth Embodiment]

Figure 4D:
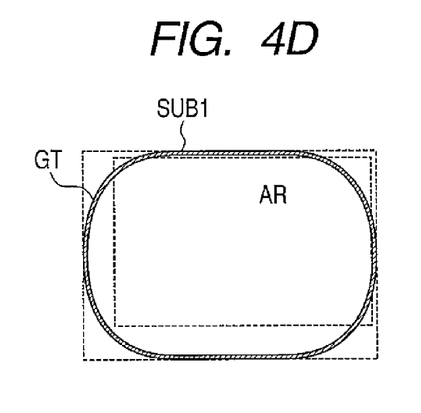

FIG. 4D is a configuration diagram showing an image display according to a fifth embodiment of the present invention.

Referring to FIG. 4D, the groove GT is formed as an oval pattern adjusted to a rectangle of the substrate based on a concentric circle from the substrate center. In this case, like FIG. 4C, the groove GT exists in the vicinity of the four corners of the substrate, thereby having the effect of absorbing the distortion stress attributable to the heat stress or humidification which is concentrated on the corners of the substrate. Differences from the case of FIG. 4C reside in that the strength is kept against the distortion stress slanting to a certain specific direction because of a curved pattern, and the manufacture process can be simplified because the groove GT can be formed in a unicursal trick. Likewise, in this pattern, a distance from the substrate center, the configuration of the oval, the number of grooves GT, and so on can be appropriately selected according to the use condition, and are not limited to the pattern of FIG. 4D.

Figure 5A:
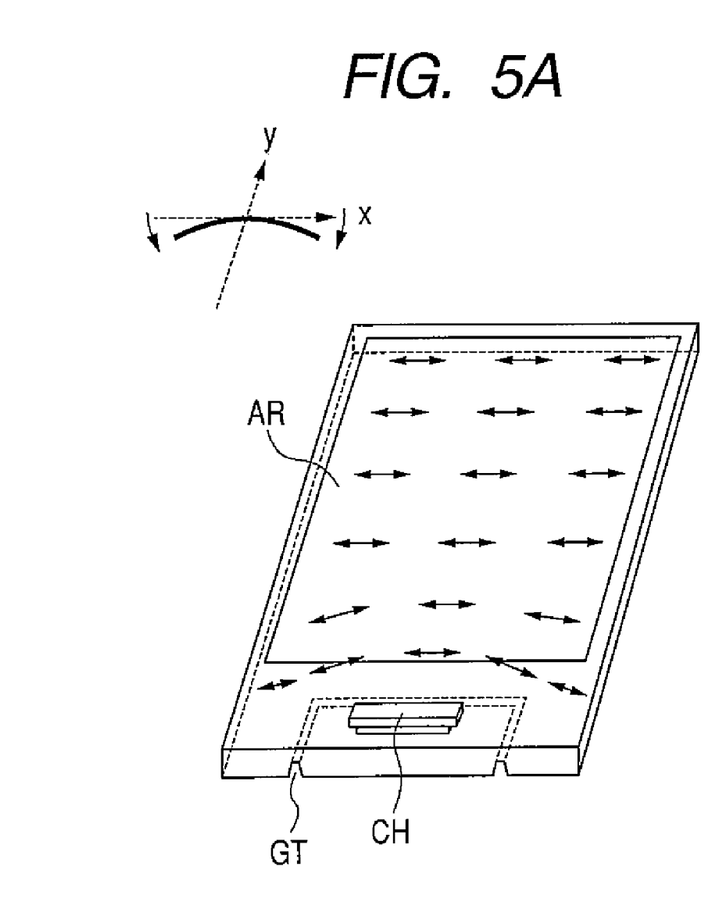
FIGS. 5A and 5B are explanatory diagrams showing the effects of the image display according to the present invention, respectively.
Figure 5B:
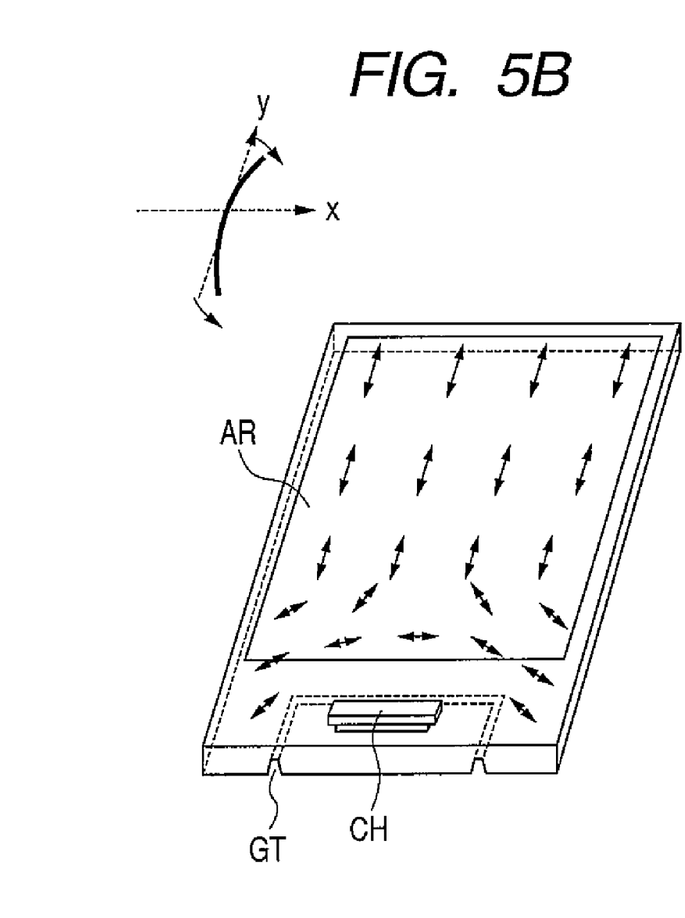

Then, the advantages of the groove GT formed in the periphery of the semiconductor chip CH will be described. FIGS. 5A and 5B are diagrams showing how the distortion stress generated by curvature of the image display is related to the areas in which the semiconductor chips CH are mounted, which are drawn by the grooves GT formed in the substrate SUB1, with a distribution of the distortion stress, respectively. FIG. 5A shows a case in which the image display is curved along the x-direction, and FIG. 5B shows a case in which the same image display is curved along the y-direction. The image display shown in FIGS. 5A and 5B has one semiconductor chip CH mounted on one end in the y-direction for simplification of description, and the groove GT defined in the rear surface of the substrate 1 is so patterned as to surround the semiconductor chip CH.

As shown in FIG. 5A, when the image display is curved along the x-direction, the distortion stresses (indicated by vectors in the figure) are generated in most of the area in parallel to the x-direction. However, in an area in which the semiconductor chip CH is mounted, which is surrounded by the groove GT, it is confirmed that the distortion stress is generated along an arcuate direction bypassing the area in which the semiconductor chip CH is mounted in the vicinity of that area without crossing that area. It is understood that this is because the distortion stress generated by curvature of the image display is absorbed by the groove GT, and not transmitted to the inside of the area in which the semiconductor chip CH is mounted, which is surrounded by the groove GT. Accordingly, no connection failure between the semiconductor chip CH and the substrate SUB1 occurs, and crack in the substrate SUB1 can be prevented by a reduction in the stress to the substrate SUB1 from the semiconductor chip CH.

As shown in FIG. 5B, when the image display is curved along the y-direction, the distortion stresses (indicated by vectors in the figure) are generated in most of the area in parallel to the y-direction. Similarly, in this case, in an area in which the semiconductor chip CH is mounted, which is surrounded by the groove GT, it is confirmed that the distortion stress is generated along an arcuate direction bypassing the area in which the semiconductor chip CH is mounted in the vicinity of that area without crossing that area. Accordingly, similarly, in this case, no connection failure between the semiconductor chip CH and the substrate SUB1 occurs, and crack in the substrate SUB1 can be prevented by a reduction in the stress to the substrate SUB1 from the semiconductor chip CH.

[Sixth Embodiment]

Figure 6A:
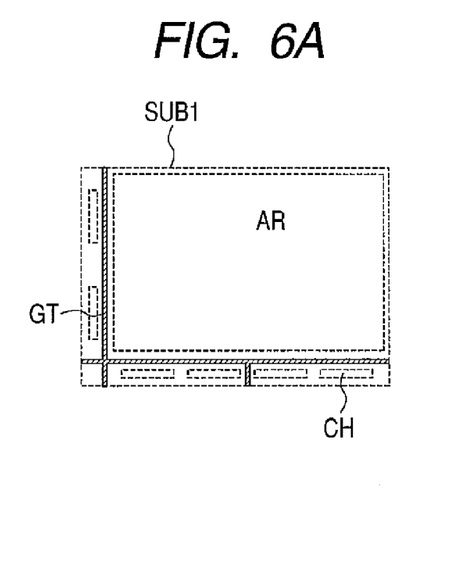
FIGS. 6A, 6B, 6C, and 6D are configuration diagrams showing sixth to ninth embodiments of the present invention, respectively.

FIG. 6A is a configuration diagram showing an image display according to a sixth embodiment of the present invention.

Referring to FIG. 6A, a configuration different from that in FIG. 1A resides in that the semiconductor chips CH surrounded by the groove GT are two semiconductor chips CH arranged adjacent to each other. As shown in FIG. 1A, when each semiconductor chip CH is surrounded by the groove GT, the distortion stress occurring in the area in which one semiconductor chip CH is mounted does not affect the area in which another semiconductor chip CH adjacent thereto is mounted. However, from the viewpoint that the distortion stress is relatively small, as described above, the groove GT may be so formed as to surround two semiconductor chips CH. Also, the number of semiconductor chips CH is not always two, but may be three or more.

[Seventh Embodiment]

Figure 6B:
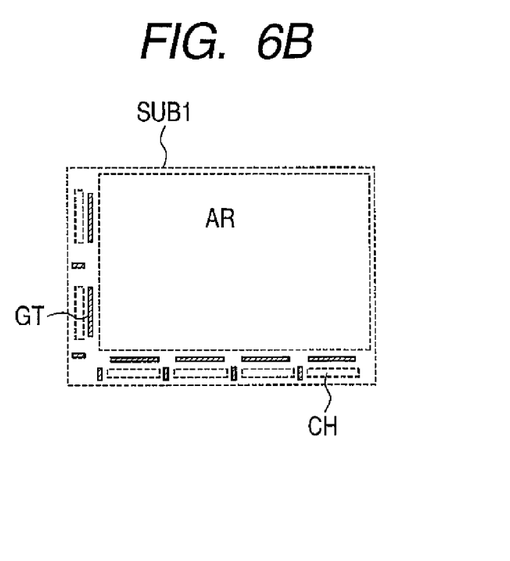

FIG. 6B is a configuration diagram showing an image display according to a seventh embodiment of the present invention.

Referring to FIG. 6B, a configuration different from that in FIG. 1A resides in that the groove GT formed to surround the semiconductor chip CH is not continuous but partially intermittent. In this case, intermittent parts of the groove GT are parts corresponding to corners in parts surrounding each semiconductor chip CH.

In order that the distortion stress is not transmitted to the area in which the semiconductor chip CH is mounted, it is desirable that the groove GT surrounding the mounted area is continuously configured. However, when the distortion stress is reduced to some degree, and there is no concern about occurrence of the connection failure between the semiconductor chip CH and the substrate SUB1, this embodiment is applicable. Also, since the flexibility of the substrates SUB1 and SUB2 can be adjusted by adjusting a length of intermittent segments of the groove GT, there is advantageous in that the optimum flexibility of the substrate can be set according to the curvature, for example, in the curved display of the image display.

[Eighth Embodiment]

Figure 6C:
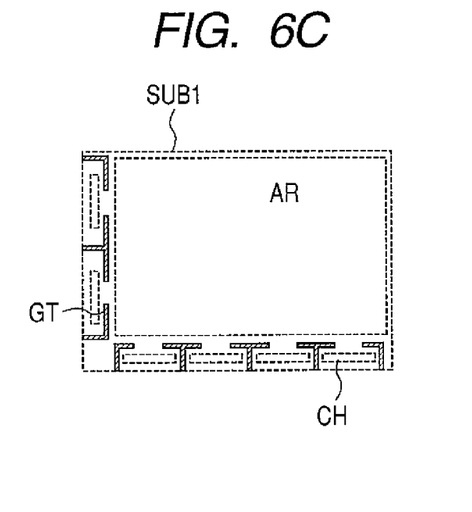

FIG. 6C is a configuration diagram showing an image display according to an eighth embodiment of the present invention.

Referring to FIG. 6C, the groove GT formed to surround each semiconductor chip CH is not continuous but partially intermittent as in the case of FIG. 6B. However, unlike the case of FIG. 6B, the intermittent parts of the groove GT is parts except the corners among the parts surrounding each semiconductor chip CH. Even in this case, the same advantages as those shown in FIG. 6B are obtained.

[Ninth Embodiment]

Figure 6D:
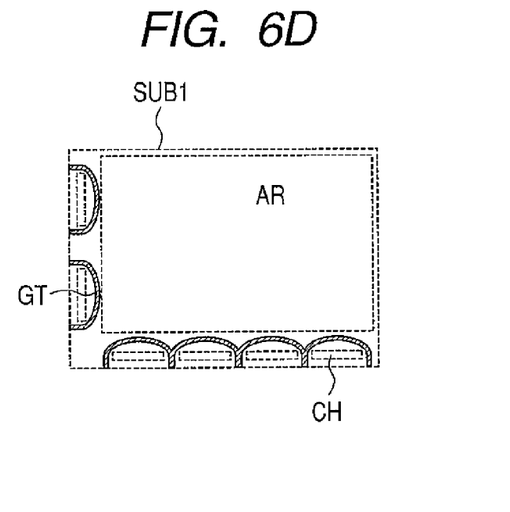

FIG. 6D is a configuration diagram showing an image display according to a ninth embodiment of the present invention.

Referring to FIG. 6D, configurations different from those in the case of FIG. 1A reside in that the area in which each semiconductor chip CH is mounted is surrounded by each individual groove GT, and the groove GT is formed by a pattern having not only a straight line but also a curved line.

COMPARATIVE EXAMPLE

Figure 7A:
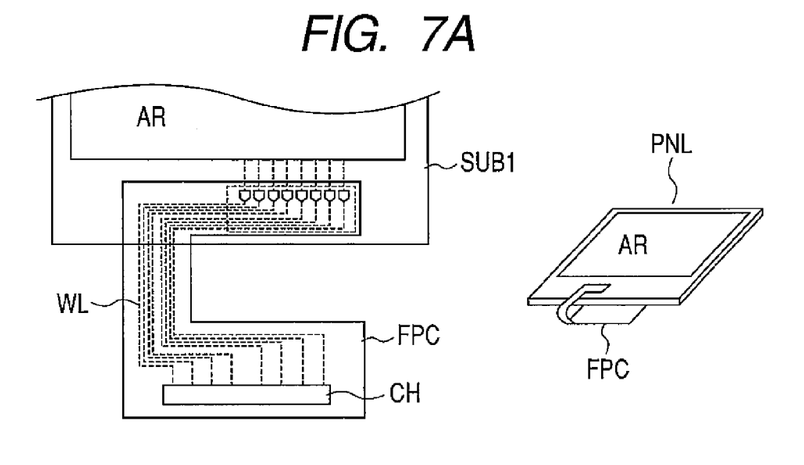
FIGS. 7A, 7B, and 7C are explanatory diagrams when an image display according to the present invention is compared with a conventional image display, respectively.
Figure 7B:
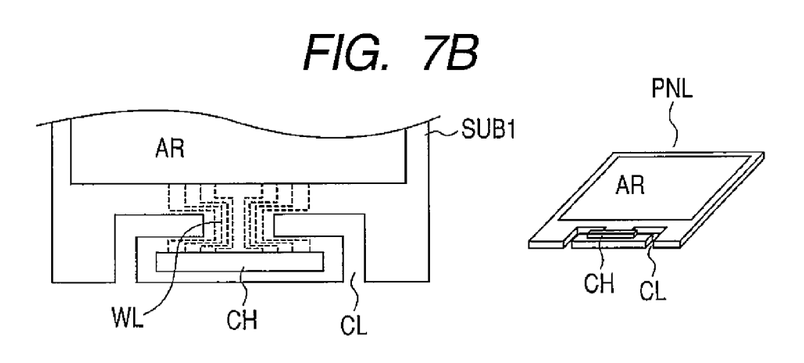

FIGS. 7A and 7B are diagrams each showing an image display configured such that the distortion stress is not transmitted to the mounted semiconductor chip.

Figure 7C:
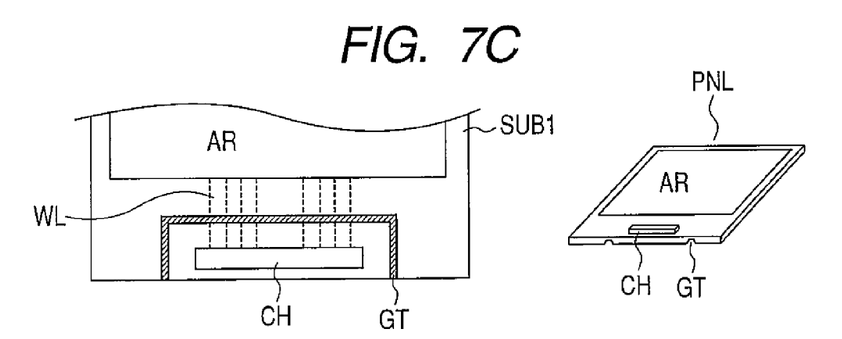

FIG. 7A shows a configuration frequently used in the conventional image display, and FIG. 7B shows a configuration disclosed in JP-A 2005-331914. FIG. 7C shows a simple configuration of the image display according to the present invention. Each of FIGS. 4A, 4B, and 4C shows an entire configuration at a right side, and a main configuration at a left side.

FIG. 7A shows a flexible substrate FPC formed independently from the display panel PNL on which the semiconductor chip CH is mounted. A terminal part of the flexible substrate FPC is connected to the display panel PNL by crimping, and a part of the flexible substrate FPC on which the semiconductor chip CH is mounted is bent, and stuck onto a rear surface of the substrate SUB1 of the display panel, for example, by an adhesive tape (not shown). The display panel PNL thus configured is advantageous in that it is difficult to transmit the distortion stress generated in the display panel to the semiconductor chip CH. However, the member costs increase because the flexible substrate FCP is prepared additionally, and the process costs for a crimping process are also required. Further, the thickness of the device per se is increased, leading to such a disadvantage that a demand to thin a cellular phone or a mobile information terminal cannot be satisfied.

FIG. 7B shows that in a part of the substrate SUB1 of the display panel PNL on which the semiconductor chip CH is mounted, a notch is defined in the substrate SUB1 so as to partially surround the semiconductor chip CH. The notch CL allows a width of the substrate SUB1 extending from the display area AR to the semiconductor chip CH to be reduced. With the above configuration, it is difficult to transmit the distortion stress to the area in which the semiconductor chip CH is mounted, which is capable of preventing such disadvantages that the member costs increase and the thickness of the device per se is thickened. However, the wiring WL between the image display region AR and the semiconductor chip CH needs to be pulled around so as to avoid the part where the notch is formed, and attention must be paid so as not to cut off the wiring WL when the notch CL is formed. Thus, there arise many disadvantages. Further, there arises such a problem that the substrate SUB is notched with the result that the part on which the semiconductor chip CH is mounted is not mechanically sufficiently held, and handing during the manufacture process drops.

FIG. 7C is a diagram showing a simple configuration of the image display according to the present invention. In the substrate SUB1 on which the semiconductor chip CH is mounted, the groove GT is formed in the rear surface of the substrate SUB1 so as to surround the area in which the semiconductor chip CH is mounted. As shown in FIG. 7A, the image display thus configured requires no additional member such as the flexible substrate FPC. Further, as shown in FIG. 7B, the conventional wiring pattern can be applied as it is without limit of the area in which the wiring is formed. Further, no holding mechanism is required since the part on which the semiconductor chip CH is mounted is integrated with the substrate SUB1 without any change, and handling during the manufacture is prevented from dropping.

[Tenth Embodiment]

Figures 8A, 8B:
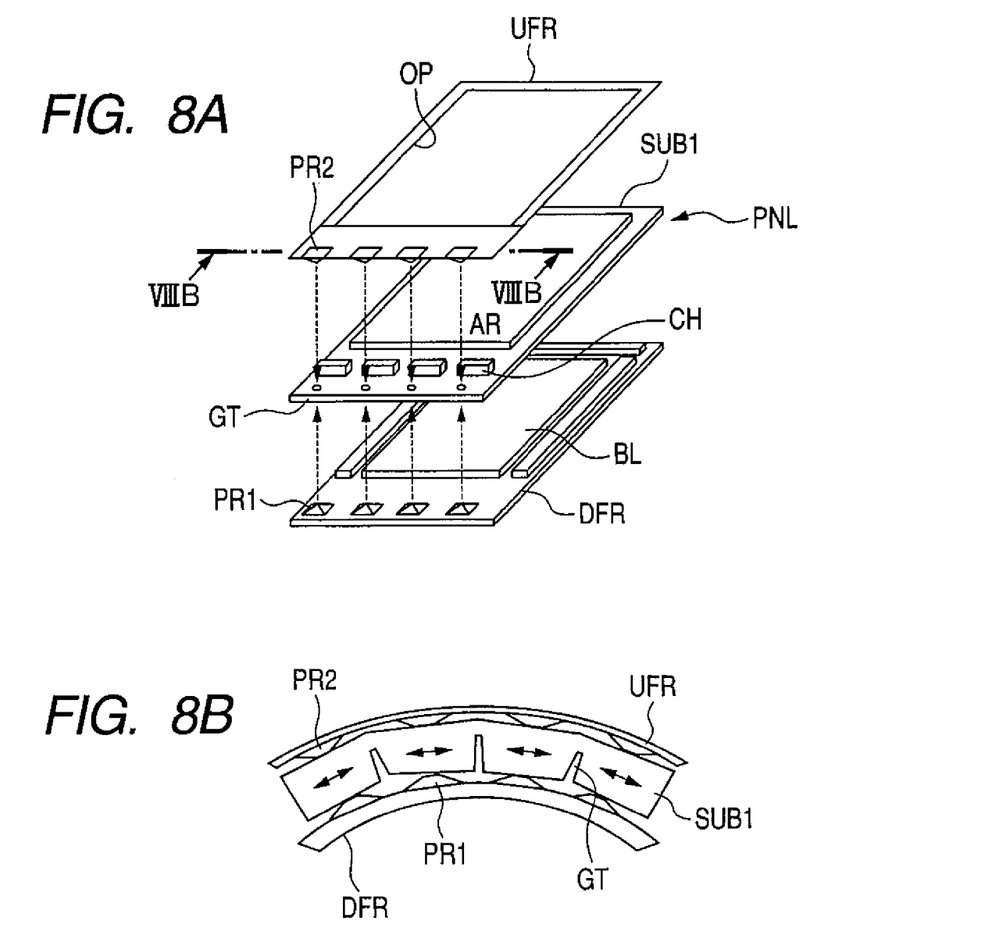
FIGS. 8A, 8B, and 8C are configuration diagrams showing an image display according to a tenth embodiment of the present invention, respectively.

FIG. 8A is a configuration diagram showing an image display according to a tenth embodiment of the present invention, shows an exploded perspective view of a configuration in which the image display shown in the above embodiments is modularized by using an upper frame and a lower frame.

Figure 8C:
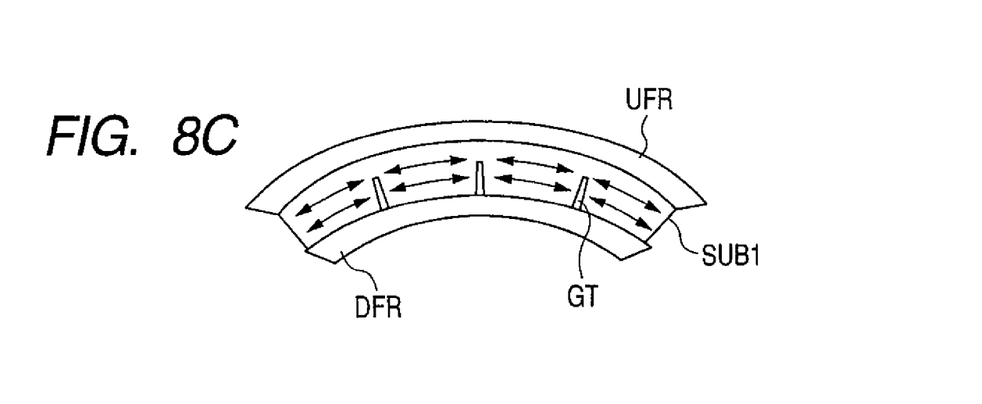

Referring to FIGS. 8A to 8C, in the case of a liquid crystal display system, a lower frame DFR has a backlight BL mounted thereon. In the case of an organic EL system, the backlight BL is a reflector plate. The backlight BL has a surface facing at least a display area AR of the display panel PNL, and generates all or parts of a light source that allows an image to be displayed on the display area AR.

The display panel PNL is stacked on the backlight BL and mounted on the lower frame DFR, and held between the lower frame DRF and the upper frame UFR. The upper frame URF has an opening (window) OP formed in a part of the display panel PNL which faces the display area AR, and the display area AR can be viewed through the opening OP.

In this example, the lower frame DFR is formed with projections PR1 being in an area surrounded by the groove GT in the substrate SUB1 of the display panel PNL, and facing a part on which no semiconductor chip CH is mounted. Also, the upper frame UFR is also formed with projections PR2 arranged to face the respective projections PR1 on the lower frame DFR.

With the above configuration, when being modularized, the substrate SUB of the display panel PNL is such that the projections PR2 of the upper frame UFR and the projections PR1 of the lower frame DFR are abutted against each other, for example, in point contact, on the upper and lower surfaces in the area surrounded by the groove GT.

In this example, in the case where the substrates SUB1 and SUB2 of the display panel PNL are flexible, when the lower frame DFR and the upper frame UFR are tabular, respectively, the modularized image display is configured to be tabular. Also, when the lower frame DFR and the upper frame UFR are of a bent configuration having a convex in the same direction, respectively, the display panel is also deformed according to that configuration, and the image display is configured to be curved.

When the lower frame DFR and the upper frame UFR are curved along the x-direction in the figure, respectively, a cross-sectional view taken along a line (corresponding to a line VIIIB-VIIIB in FIG. 8A) connecting the projections PR1 formed on the lower frame DFR (or the projections PR2 formed on the upper frame UFR) is shown in FIG. 8B.

In this case, as is apparent from FIG. 8B, each area of the substrate SUB1 which is surrounded by the groove GT is so-called point-supported by the projection PR2 of the upper frame UFR and the projection PR1 of the lower frame DFR. That is, a part in which the groove GT is defined between an area surrounded by one groove GT and an area surrounded by another adjacent groove GT is curved. However, the area surrounded by the one groove GT and the area surrounded by the another groove GT can be kept planar, respectively. This means that the distortion stress generated in the areas surrounded by the respective grooves GT can be reduced, and an adverse affect of the distortion stress on the semiconductor chips CH mounted in those areas can be avoided.

For reference, FIG. 8C is a diagram showing a case where the above-mentioned projections are not formed on the upper frame UFR and the lower frame DFR, respectively, and corresponds to FIG. 8B. A part of the substrate SUB1 of the display panel PNL in which the groove is defined is surface-supported by the upper frame UFR and the lower frame DFR on the upper and lower surfaces thereof. For that reason, as a result that the substrate SUB1 is curved according to the degree of curvature of the upper frame UFR and the lower frame DFR, the distortion stress generated in the substrate SUB1 becomes a large value. For that reason, an adverse affect of the distortion stress on the semiconductor chips CH mounted on those areas cannot be avoided.

[Eleventh Embodiment]

Figure 9:
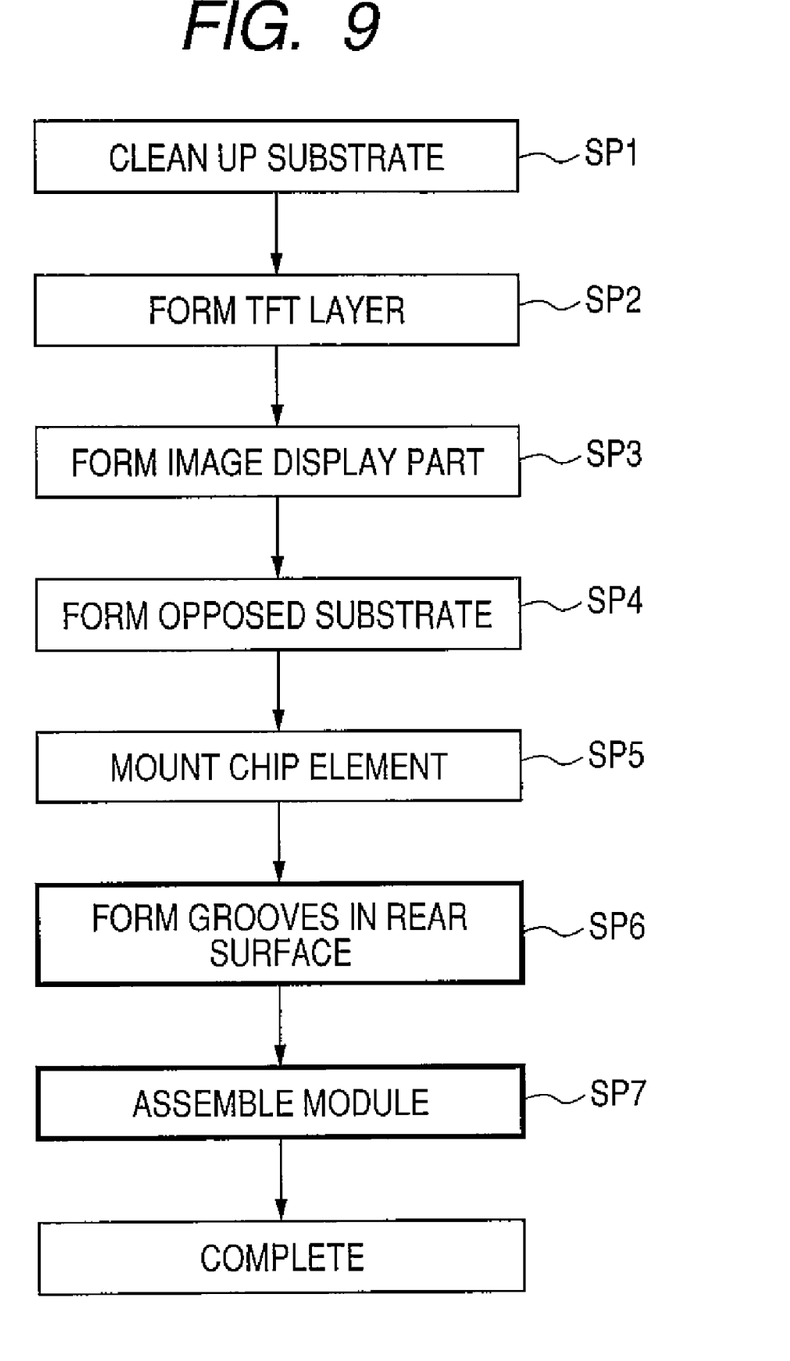
FIG. 9 is a flowchart showing an example of a method for manufacturing the image display according to the present invention.

FIG. 9 is a flowchart showing an example of a method of manufacturing an image display according to the present invention.

First, in Step SP1, a flexible substrate SUB1 made of resin is prepared, and the substrate SUB1 is cleaned. Then, in Step SP2, a TFT layer PLL adheres to a surface of the substrate SUB1 through an adhesive layer. The TFT layer PLL is formed of a laminated body in which an insulated film formed on a provisional substrate, for example, made of glass, a semiconductor layer, a metal film, and so on are laminated on each other in a given order in a given pattern. The TFT layer PLL is transferred onto the substrate SUB1, and formed on the substrate SUB1. The TFT layer PLL is formed with in the planar area. On the TFT layer PLL are formed a large number of pixels arranged in a matrix and a driver circuit for driving those pixels on a planar area thereof. Then, in Step SP3, a seal material SL is formed on a surface of the substrate SUB1 on which the TFT layer PLL is formed, so as to surround the display area AR, and liquid crystal is sealed in the seal material SL, for example, in the case of a liquid crystal display system. In the case of an organic EL system, an organic film emitting a light is formed by a method such as vacuum deposition. In Step SP4, a flexible substrate SUB2 made of a resin is prepared, and the substrate SUB2 is arranged to face the substrate SUB1. The substrate SUB2 may have a function of an opposed electrode. Then, in Step SP5, the semiconductor chip CH is mounted on the substrate SUB1. Terminals of the wiring layer are exposed from the TFT layer PLL so as to be connected to the respective electrodes of the semiconductor chips CH, and the semiconductor chips CH and the wiring layer are electrically connected to each other by a so-called face down bonding. Then, in Step SP6, the grooves GT are defined in the rear surface of the substrate SUB1. An example of the method of forming the grooves GT has been described with reference to FIG. 2. Then, in Step SP7, as shown in FIG. 8A, the backlight BL, the lower frame DFR, the upper frame UFR, and so on are prepared, and modularized to complete the manufacture of the image display. In this case, as shown in FIG. 8A, the projections PR1 and PR2 are provided on the lower frame DFR and the upper frame UFR, respectively.

This leads to an advantage that when the lower frame DFR and the upper frame UFR are configured to be curved, the distortion stress generated in the area of the substrate SUB1 of the display panel PNL in which the semiconductor chips CH are mounted can be reduced.

[Twelfth Embodiment]

Figure 10A:
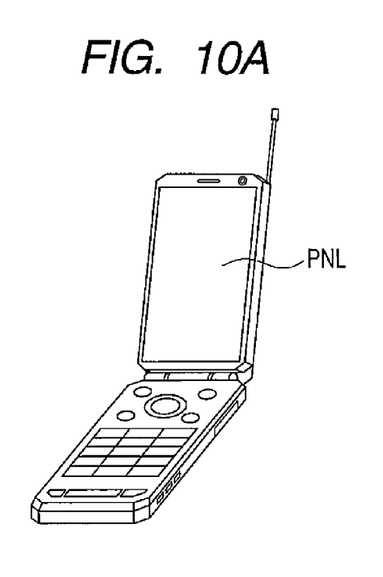
FIGS. 10A, 10B, 10C, and 10D are explanatory diagrams showing electronic devices each equipped with the image display of the present invention, respectively.
Figure 10B:
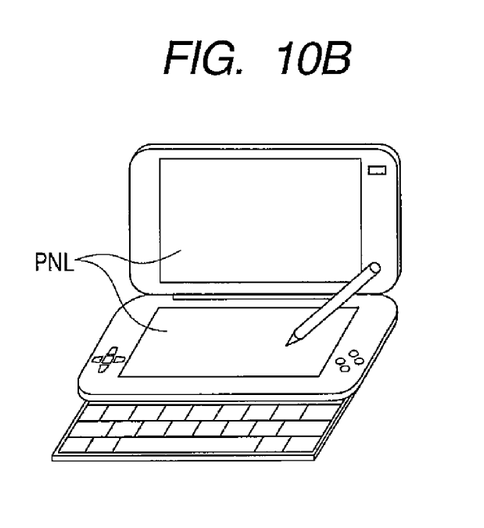
Figure 10C:
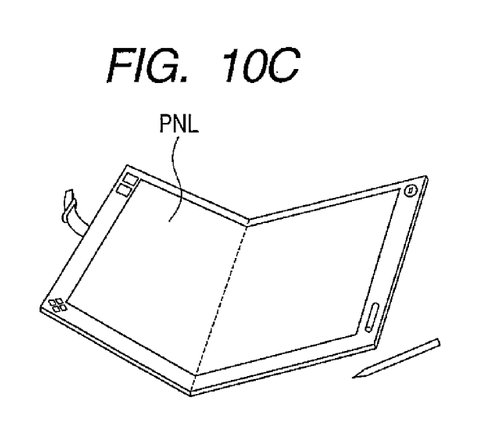
Figure 10D:
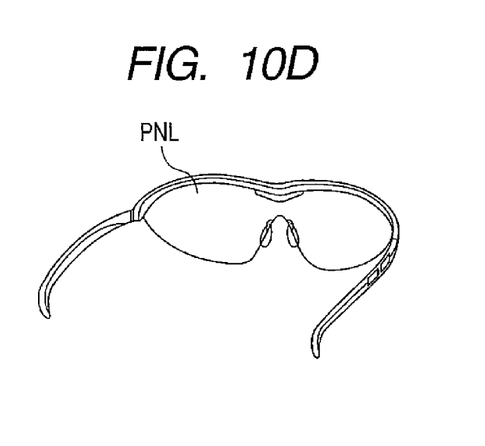

FIGS. 10A to 10D are diagrams showing examples of an electronic device into which the image display of the present invention is incorporated in use, respectively. FIG. 10A is a cellular phone equipped with the display panel PNL of the present invention. FIG. 10B is a portable game machine equipped with the display panel PNL of the present invention. FIG. 10C is an electronic book equipped with the display panel PNL of the present invention. FIG. 10D is an electronic goggle equipped with the display panel PNL of the present invention.

What is claimed is:

1. An image display, comprising:
   a display panel;
   a first frame disposed on one surface of the display panel; and
   a second frame disposed on another surface of the display panel, in which the display panel, the first frame, and the second frame are modularized,
   wherein the display panel has a flexible substrate on one surface of which is formed an image display part, and in another surface of which is continuously or intermittently formed a groove having a depth not reaching a thickness of the substrate, and
   wherein a projection is formed on each surface of the first frame and the second frame at the display panel side so as to face an area of the substrate in which no groove is formed, and hold the substrate.

2. The image display according to claim 1, wherein the first frame and the second frame are so curved as to project in the same direction.

3. The image display according to claim 1, wherein the display panel is a liquid crystal display panel, and a backlight is disposed between the display panel and the second frame.

4. The image display according to claim 1, wherein the display panel is an organic EL panel, and a reflector plate is disposed between the display panel and the second frame.

* * * * *